US006396573B1

(12) United States Patent
Pimpinella

(10) Patent No.: US 6,396,573 B1
(45) Date of Patent: May 28, 2002

(54) SYSTEM AND METHOD FOR OPTICALLY TESTING BROADCASTING SYSTEMS

(75) Inventor: Richard J. Pimpinella, Hampton, NJ (US)

(73) Assignee: Fitel U.S.A. Corp., Norcross, GA (US)

( * ) Notice: Subject to any disclaimer, the term of this patent is extended or adjusted under 35 U.S.C. 154(b) by 0 days.

(21) Appl. No.: 09/505,818

(22) Filed: Feb. 17, 2000

(51) Int. Cl.[7] .............................................. G01N 21/00
(52) U.S. Cl. ...................................................... 356/73.1
(58) Field of Search ............................... 356/73.1, 352; 359/120, 121, 124, 127, 128, 130, 177, 178; 385/24, 27, 31, 37, 43, 46

(56) References Cited

U.S. PATENT DOCUMENTS

| | | | | |
|---|---|---|---|---|
| 5,504,617 A | * | 4/1996 | Spirit | ........................ 359/341 |
| 5,778,117 A | * | 7/1998 | Inoue et al. | |
| 5,923,797 A | * | 7/1999 | Baugh et al. | .................. 385/16 |
| 5,926,298 A | * | 7/1999 | Li | ............................... 359/120 |
| 6,009,220 A | * | 12/1999 | Chan et al. | |
| 6,011,623 A | * | 1/2000 | MacDonald et al. | |

* cited by examiner

Primary Examiner—Frank G. Font
Assistant Examiner—Tu T. Nguyen
(74) Attorney, Agent, or Firm—Gibbons, Del Deo, Dolan, Griffinger & Vecchione

(57) ABSTRACT

The present invention is a system and method for optically testing secondary fiber paths from a splitter to local customer areas. The optical splitter splits the CATV signal and transmits it to various local customer areas. A network communications signal such as a smart local access network (SLAN) signal and a test signal such as an optical time domain reflectometer (OTDR) signal are transmitted to an optical switch having various output paths. The SLAN signal controls the OTDR test signal and the switch switches the transmission of the test signal along the output paths to the secondary fiber paths to test the integrity of the secondary fiber paths.

13 Claims, 2 Drawing Sheets

SYSTEM AND METHOD FOR OPTICALLY TESTING BROADCASTING SYSTEMS

FIELD OF THE INVENTION

The present invention generally relates to the testing of broadcasting systems, and more particularly to the testing of optical fiber paths containing optical splitters to divide broadcast signals over multiple secondary fiber paths.

BACKGROUND OF THE INVENTION

Broadcasting systems such as cable television (CATV) networks utilize optical transmitters and optical fiber paths to broadcast signals from the head end to local customer areas. These optical signals may later be converted (at a conversion location, for example) to electrical signals which are carried over traditional coaxial cable to the final viewers or individual local customer areas. In typical CATV networks, a CATV laser transmitter at the head end sends a laser broadcasted CATV signal through an optical fiber path to distribute the CATV programming to local customer areas. As with most communications providers, CATV providers are concerned with service quality as perceived by the customer. Service quality is negatively impacted when the cable transmission system is improperly functioning. In addition, down time within an improperly functioning cable system infrastructure also translates to lost or potentially lost revenue and maintenance time for locating the damaged fiber.

In typical CATV networks, such as the one shown in FIG. 1, a CATV transmitter 110 at the head end sends a laser broadcasted CATV signal through an optical fiber path 120. The primary optical fiber path 120 often contains a splitter or passive optical network (PON) 130 which divides broadcast signals over multiple secondary fiber paths 140, which are distributed out to multiple local customer areas 145.

To test the integrity of the secondary fiber paths beyond the PON 130, Optical Time Domain Reflectometer technology (OTDR) is required. In the shown embodiment, an OTDR test signal is sent out along the primary optical fiber path 120, through the PON 130 and onto the secondary fiber paths 140. A returned OTDR test signal trace comprises the superposition of each secondary fiber trace. The analysis of such complex OTDR traces containing multiple fiber path data beyond the PON is not easily managed because the single trace does not distinguish between the different secondary fiber paths. Thus, if an event such as a break or bend along one of the secondary fibers occurs, it is difficult to determine which secondary fiber is experiencing the event using the single OTDR trace.

One method currently used for testing secondary fiber paths beyond a splitter is to temporarily cut each secondary fiber and determine which superposition peak is associated with each of the cuts. Another method is to use a polarization splitting device at the PON to direct polarization at different wavelengths beyond the splitter. Yet another method currently being used is analysis and simulation equipment which simulates what the OTDR trace should look like. The OTDR trace simulation may then be compared to the actual fiber trace to determine which secondary fiber path is experiencing a problem. These methods are both costly and inefficient ways of testing secondary fiber paths in a cable television system. In addition, these methods are imprecise in indicating which secondary fiber paths is experiencing a new event.

SUMMARY OF THE INVENTION

The present invention is a system and method for optically testing broadcasting system such as cable television (CATV) systems including an optical splitter or passive optical network (PON). The CATV system broadcasts a combined signal comprising an optical signal such as a CATV signal, a network communications signal such as a smart local access network (SLAN) signal, and a test signal such as an optical time domain reflectometer (OTDR) signal from a head end, along a primary fiber path. The invention uses wavelength-division multiplexing (WDM) to separate out the SLAN communications signal and the OTDR test signal at an optical router. The SLAN and OTDR test signals are sent to an optical switch co-located with the PON which is controlled by, for example a fiber administration system. The SLAN signal controls the optical switch. The CATV signal is sent directly to the PON to be distributed to the secondary fiber paths. Thus, the OTDR test signal is enabled to bypass the PON.

The optical switch has several outputs, each of which corresponds to a secondary fiber path. When testing is needed, the OTDR signal is transmitted along one of the secondary fiber paths, as directed by the optical switch. The OTDR test signal is reflected back to create a separate trace for each of the secondary fiber paths. When a problem occurs along one of the secondary fibers, such as a cut or bending of the fiber, the present invention enables determination of which fiber is experiencing the problem by allowing one to read the signal trace of each of the secondary fibers to find the trace containing a new event. Thus, each of the secondary fibers can be easily individually accessed.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
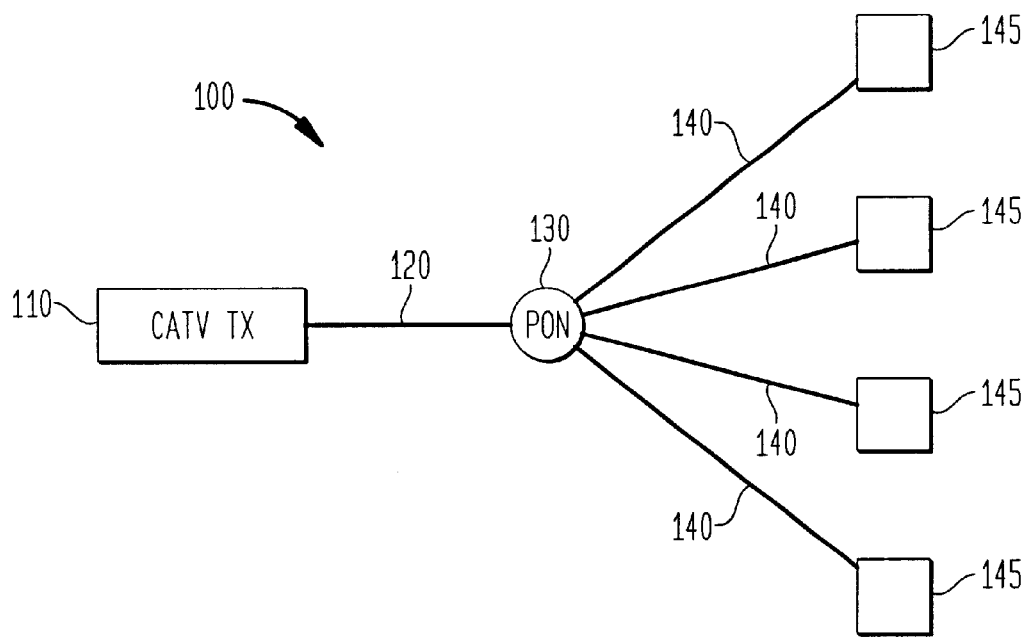
FIG. 1 is a block diagram of a typical cable television network.
Figure 2:
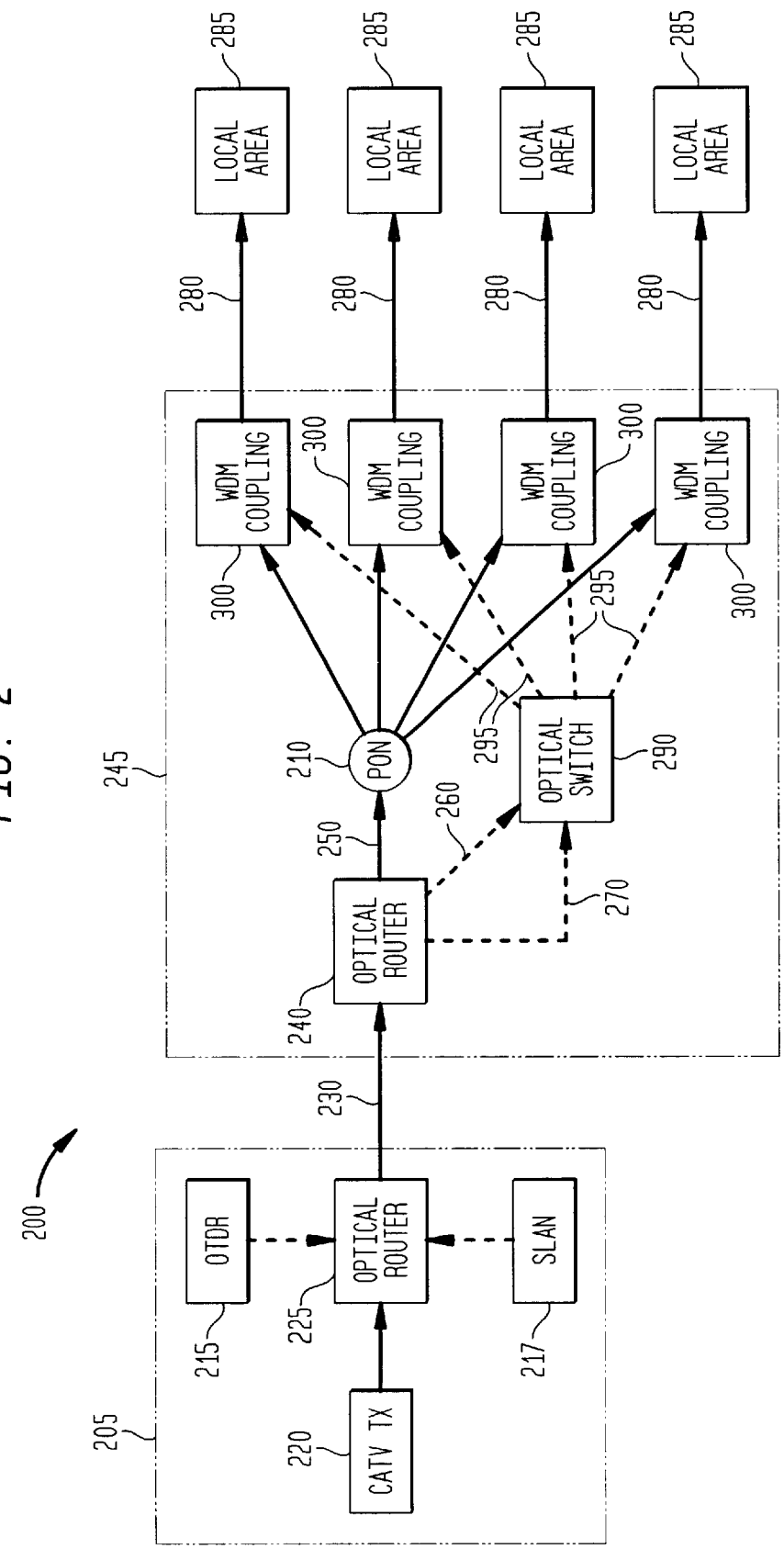
FIG. 2 is a block diagram showing a system and method for optically testing a cable television system having a splitter resulting in secondary fiber paths.

FIG. 2 shows a system which can be used for generating optical test signals in a broadcasting system such as a cable television (CATV) system 200 including a splitter or passive optical network (PON) 210. At a head end 205, the system includes a cable television transmitter 220 which produces a CATV signal and broadcasts the CATV signal to a primary optical router 225. The head end 205 further includes an optical time domain reflectometer (OTDR) 215 transmitting an OTDR signal to the primary optical router 225 and a smart local access network 217 (SLAN) transmitting a SLAN signal to the primary optical router 225. At the primary optical router 225, a wave division multiplexer (WDM) (not shown) combines the CATV signal, OTDR signal and SLAN signal to form a combined signal.

The combined signal is broadcast along a primary optical fiber path 230 to secondary optical router 240. The secondary optical router 240 is located at a secondary area 245 outside of the head end 205. The secondary optical router 240 has a second wavelength division multiplexer (not shown) to separate out the CATV signal, the OTDR test signal, and the SLAN signal from the combined signal.

Alternatively, the SLAN signal may be sent directly from the SLAN over an Ethernet to the secondary optical router 245.

From the secondary optical router 240, the CATV signal is directed along path 250 to the PON 210, while the OTDR test signal is directed along path 260. The SLAN optical signal is converted within the secondary optical router 240 to an electrical control signal which is directed along path 270 to the optical switch 290. The PON 210 distributes the CATV signal to WDM couplers 300 and onto local customer areas 285 along secondary fiber paths 280.

The optical switch 290 has multiple output paths 295 to correspond with each secondary fiber path 280. A single output path 295 is coupled with a single corresponding secondary fiber path 280 using the WDM coupler 300. The WDM coupler 300 combines the CATV signal and the OTDR signal to transmit a newly combined signal along each secondary fiber path 280. The optical switch is controlled by the SLAN signal which allows for the switching of the OTDR test signal among the various output paths 295. Thus, the optical switch 290 moves the transmission of the OTDR test signal among the various output paths 295 to test the integrity of each of the corresponding secondary fiber paths 280. It would be understood that the testing of the secondary fiber paths 295 can also be continuous.

In operation, the head end 205 broadcasts a combined signal from the primary optical router 225 along the primary optical fiber path 230 to the secondary optical router 240. While the combined signal is transmitted along the primary fiber path the OTDR signal tests the integrity of the primary fiber path 230. At the secondary optical router 240 the WDM (not shown) separates the combined signal into the CATV signal, the OTDR test signal, and the SLAN signal.

The CATV signal is transmitted directly to the PON 210 along path 250. From the PON 210, the CATV signal is simultaneously distributed along secondary fiber paths 280, through WDM couplers 300 and ultimately broadcast into the various local customer areas 285.

Simultaneously, the OTDR test signal and the SLAN electrical control signal are transmitted from the secondary optical router 240 to the optical switch 290 along paths 260 and 270, respectively. The SLAN signal electrically controls the optical switch 290 and switches the transmittal of the OTDR test signal between the various output paths 295 to the WDM couplers 300. The WDM couplers combine the CATV signal and OTDR test signal and transmit this combined signal to the local areas 285. The OTDR signal tests the integrity of the secondary fiber paths 280. The SLAN signal controls the optical switch 290 and determines which secondary fiber path 280 needs testing. The OTDR signal determines whether there has been an event such as breaking or bending along the secondary fiber paths 280. Thus, each of the secondary fiber paths 280 can be individually tested so that if an event has occurred along one of the secondary fiber paths 280, it is easy to determine which particular secondary fiber path 280 needs to be fixed. Therefore, the integrity of each of the secondary fiber paths 280 is individually monitored and tested by the OTDR test signal.

It will be understood that the embodiment of the present invention system and method specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. In a broadcasting system having at least one transmitter generating an optical signal, a test signal, and a network communications signal, said optical signal, said test signal, and said network communications signal being a combined signal, a system for optically testing a plurality of secondary fiber paths resulting from a splitter comprising:

an optical router for receiving said combined signal;

a wavelength division multiplexer (WDM), located at said optical router, for demultiplexing out said optical signal, said test signal and said network communications signal from said combined signal, wherein said optical signal is transmitted to said splitter and split into a plurality of secondary optical signals, said plurality of secondary optical signals being individually transmitted to a plurality of local customer regions along said plurality of secondary fiber paths;

an optical switch for receiving said test signal and said network communications signal from said router, said optical switch having a plurality of output paths corresponding with said plurality of secondary fiber paths, wherein said network communications signal controls said optical switch and switches transmission of said test signal among said plurality of output paths;

a plurality of couplers, each of said couplers coupling one of said plurality of output paths with one of said plurality of secondary fiber paths, wherein said coupler combines said test signal with one of said secondary optical signals to test said secondary fiber path.

2. The system of claim 1, wherein said optical signal, said test signal and said network communications signal are combined at a primary optical router using a WDM coupler to form said combined signal.

3. The system of claim 2 wherein said test signal is an optical time domain reflectometer (OTDR) signal.

4. The system of claim 2 wherein said network communications signal is a smart local access network (SLAN) signal.

5. In a cable television (CATV) system having at least one transmitter generating a CATV signal, an optical time domain reflectometer (OTDR) signal, and a smart local access network (SLAN) signal, said CATV signal, said OTDR signal, and said SLAN signal being combined at a primary optical router using a wave primary division multiplexer (WDM) to form a combined signal, a system for optically testing a plurality of secondary fiber paths resulting from a splitter comprising:

a secondary optical router for receiving said combined signal from said primary optical router;

a secondary WDM, located at said secondary optical router, for separating out said CATV signal, said OTDR signal and said SLAN signal from said combined signal, wherein said CATV signal is transmitted to said splitter and split into a plurality of secondary CATV signals, said plurality of secondary CATV signals being individually transmitted to a plurality of local customer areas along said plurality of secondary fiber paths;

an optical switch for receiving said OTDR signal and said SLAN signal from said secondary optical router, said optical switch having a plurality of output paths corresponding with said plurality of secondary fiber paths, wherein said SLAN signal controls said optical switch and switches transmission of said OTDR signal among said plurality of output paths;

a plurality of couplers, each of said couplers coupling one of said plurality of output paths with one of said plurality of secondary fiber paths, wherein said coupler combines said OTDR signal with one of said secondary CATV signals, as determined by said SLAN signal.

6. In a broadcasting system, a method for testing secondary fiber paths comprising:

generating a combined optical signal comprised of an optical signal, a test signal and a network communications signal, providing an optical router;

transmitting the combined signal to said optical router and separating out said combined signal into said test signal, said optical signal and said network communications signal using said optical router;

splitting the optical signal from said optical router to form a plurality of secondary signals, providing an optical switch having a plurality of outlets;

directing said test signal and said network communication signals from said optical router to said optical switch;

using said network communications signals to control said optical switch to switch the transmission of said test signal among the plurality of outlets;

coupling the test signal from each of the plurality of outlets with one of the plurality of secondary signals, transmitting said coupled test signal and said secondary signal along said secondary fiber paths to local customer areas whereby the test signal can be used to individually test each of said secondary fiber paths.

7. The method of claim 6 wherein said step of generating a combined optical signal comprises:

individually generating a test signal, an optical signal and a network communications signal;

providing a primary optical router having a primary wavelength division multiplexer (WDM);

combining said optical signal, said test signal and said network communications signal at said primary optical router using said primary WDM.

8. The method of claim 6 wherein said step of separating out said combined signals comprises:

providing an optical router having a wavelength division multiplexer (WDM); and multiplexing out said combined signal into said test signal, said network signal and said optical signal using said WDM at said optical router.

9. The method of claim 6 wherein said optical switch is controlled by a fiber administration system.

10. The method of claim 6, wherein said network communications signal is a smart local access network (SLAN) signal.

11. The method of claim 6 wherein said test signal creates an individual trace corresponding to each of said secondary optical signals.

12. The method of claim 6 wherein said broadcasting system is a cable television (CATV) system and said optical signal is a CATV signal.

13. The method of claim 6 wherein said test signal is an optical time domain reflectometer (OTDR) test signal.

* * * * *